United States Patent
Sassa et al.

(10) Patent No.: US 10,244,583 B2
(45) Date of Patent: Mar. 26, 2019

(54) GLOW PLUG WITH COMBUSTION PRESSURE SENSOR

(71) Applicant: NGK SPARK PLUG CO., LTD., Nagoya-shi, Aichi-ken (JP)

(72) Inventors: Akimitsu Sassa, Toukai (JP); Yoshihiro Yamamoto, Kitanagoya (JP); Hiroshi Harada, Tajimi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 708 days.

(21) Appl. No.: 14/710,939

(22) Filed: May 13, 2015

(65) Prior Publication Data
US 2015/0334777 A1  Nov. 19, 2015

(30) Foreign Application Priority Data
May 16, 2014  (JP) ................. 2014-102841

(51) Int. Cl.
  *H05B 3/00* (2006.01)
  *G01L 9/00* (2006.01)
  *F23Q 7/00* (2006.01)

(52) U.S. Cl.
  CPC .......... *H05B 3/0042* (2013.01); *F23Q 7/001* (2013.01); *G01L 9/0051* (2013.01); *H05B 3/0014* (2013.01); *F23Q 2007/002* (2013.01)

(58) Field of Classification Search
  CPC ... G01L 9/0051; H05B 3/0014; H05B 2/0042; F23Q 7/001; F23Q 2007/002
  USPC ....................................... 219/201
  See application file for complete search history.

(56) References Cited

U.S. PATENT DOCUMENTS

| 4,549,071 A * | 10/1985 | Hatanaka ............. F23Q 7/001 123/145 A |
| 5,206,483 A * | 4/1993 | Aota ................... F23Q 7/001 123/145 A |
| 5,362,944 A * | 11/1994 | Hatanaka ............. F23Q 7/001 219/270 |
| 2004/0178185 A1* | 9/2004 | Yoshikawa ........... F23Q 7/001 219/270 |
| 2008/0296281 A1 | 12/2008 | Glock et al. |
| 2013/0269641 A1* | 10/2013 | Watanabe ............ F23Q 7/001 123/145 A |

FOREIGN PATENT DOCUMENTS

| JP | 63-173660 U | 11/1988 |
| JP | H03-001014 A | 1/1991 |
| JP | H04-161724 A | 6/1992 |

(Continued)

OTHER PUBLICATIONS

Communication dated Jan. 9, 2018, from the Japanese Patent Office in counterpart application No. 2014-102841.

*Primary Examiner* — Dana Ross
*Assistant Examiner* — Kuangyue Chen
(74) *Attorney, Agent, or Firm* — Sughrue Mion, PLLC

(57) ABSTRACT

A glow plug including a heater (200) having a rear heat-generating element (260) formed of a resistance heat-generating element, and provided in an axial region thereof between a forward end (136) of a housing and a rear end (315) of a displacement member (300) located rearward of the forward end (136). The heat-generating element (260) is arranged separately from a forward heat-generating element (205) provided at a forward end portion of the heater.

26 Claims, 10 Drawing Sheets

(56) References Cited

FOREIGN PATENT DOCUMENTS

| | | |
|---|---|---|
| JP | H04-257615 A | 9/1992 |
| JP | 2008-513717 A | 5/2008 |
| JP | 2010-139148 A | 6/2010 |
| JP | 2014-085022 A | 5/2014 |

* cited by examiner

GLOW PLUG WITH COMBUSTION PRESSURE SENSOR

TECHNICAL FIELD

The present invention relates to a glow plug with a combustion pressure sensor adapted to promote ignition within a combustion chamber of an engine and to sense (detect) combustion pressure as well. Specifically, the present invention relates to a glow plug with a combustion pressure sensor which is mounted to an engine head such that its heater is exposed to the interior of a combustion chamber for the purpose of promoting ignition of fuel and receiving, through the heater, combustion pressure (combustion gas pressure) in the combustion chamber so as to sense the combustion pressure by means of a sensor (a strain sensor (gauge), a piezoelectric element, or the like), provided inside or outside a housing which holds the heater, thereby controlling a fuel injection system, etc.

BACKGROUND ART

There are known various types of such a glow plug with a combustion pressure sensor (hereinafter, may be referred to merely as a glow plug) (refer to, for example, Patent Document 1). FIG. 10 is a longitudinal, sectional view showing a simplified forward portion of a glow plug 100 of the same type. The glow plug 100 of FIG. 10 is configured such that a rodlike (circular columnar) ceramic heater (hereinafter, may be referred to as a heater) 200 having, at its forward end 201, a forward heat-generating element 205 formed of a resistance heat-generating element and adapted to generate heat through application of electricity is disposed in a tubular housing 110 with the forward end 201 protruding forward from a forward end 136 of the housing 110. In the present application, a forward end of a glow plug or forward ends of its components (members) correspond to their lower ends in FIG. 10, and rear ends correspond to their opposite ends (upper ends). The "broken line" in the enlarged view of FIG. 10 indicates a portion, in the vicinity of a combustion chamber, of a plug hole of an engine head to which the glow plug 100 is mounted. In the glow plug 100, the heater 200 is disposed in the housing 110 in such a manner as to be displaceable by a very small distance along an axis G (axial direction) in response to received combustion pressure, whereby a sensor senses the pressure. In the glow plug of FIG. 10, the heater 200 is disposed with a space (annular gap) formed in a radial direction in cooperation with the inner circumferential surface of the housing 110; when the heater 200 is pressed rearward by combustion pressure and is thus displaced rearward in relation to the housing 110, the displacement (or associated pressure) is transmitted to a sensor 400 incorporated in the housing 110, through a pressure transmission member 350 formed of a shaft member (e.g., a hollow shaft member) fixed to the heater 200; and the sensor outputs an electric signal corresponding to relative displacement of the heater 200 or associated pressure.

The glow plug 100 has a very small space in a radial direction between the inner circumferential surface of a forward end portion of the housing 110 and the outer circumferential surface of the heater 200, and the space assumes the form of an annular space (gap) communicating with an opening at the forward end 136. Thus, in order to prevent the problem that combustion gas having high temperature and high pressure enters the space K, reaches rearward within the housing 110, and leaks out to the ambient atmosphere, a displacement member (membrane) 300 formed of a heat-resistant material is provided. The displacement member 300 has the form of, for example, a ring or a short tube, is disposed around the heater 200, and is circumferentially welded to the housing 110 side and to the heater 200 side, thereby axially blocking the space K in a sealed condition. Meanwhile, since the displacement member 300 needs to allow displacement of the heater 200 along the axis G, the displacement member 300 is formed of a thin metal sheet (membrane) so as to be deformable. In the glow plug 100 of FIG. 10, the inner circumferential surface of a forward end portion of the housing 110 is expanded in diameter at a position located axially inward of the opening of the forward end 136 of the housing 110; the displacement member 300 has the form of a diameter-differed short cylinder such that a forward portion has a small diameter, while a rear portion has a large diameter; and the large-diameter portion of the displacement member 300 is disposed in the diameter-expanded space K located at an axially deep position and is joined to the housing 110 side, while the small-diameter portion of the displacement member 300 is joined to the heater 200 (outer circumferential surface) side. An intermediate portion of the thus-configured displacement member 300 is deformed forward or rearward as is a diaphragm, in response to displacement along the axis G of the heater 200 in relation to the housing 110. Notably, since the displacement member 300 made of metal cannot be directly welded to the ceramic heater 200, according to ordinary practice, the displacement member 300 is welded to a metal pipe 250 which is externally fitted and fixed to the heater 200.

PRIOR ART DOCUMENT

Patent Document

[Patent Document 1] Japanese Patent Application Laid-Open (kokai) No. 2010-139148

SUMMARY OF THE INVENTION

Problem to be Solved by the Invention

Incidentally, in a diesel engine, soot composed of various components is generated in the process of combustion. Because of the structure of a forward portion of the glow plug 100, such soot is checked by the displacement member 300 located between the inner circumferential surface of a forward end portion of the housing 110 and the outer circumferential surface of the heater 200; however, as indicated by black dots in the enlarged view (at the right) of FIG. 10, soot enters the annular space K. As a result, the soot which has entered adheres to the surface of the displacement member 300 located at an axially deep position in the space K (located at an axially inward (rearward) of a combustion-chamber-side space KA), accumulates, and remains, thereby hindering deformation of the displacement member 300. Meanwhile, since the displacement member 300 is deformed in response to displacement along the axis G of the heater 200, existence of such soot causes deterioration in combustion pressure sensing performance.

As a result of entry of soot into the above-mentioned annular space K, soot adheres to and accumulates on not only the surface (forward-oriented surface) of the displacement member 300 which surrounds the space K but also the inner circumferential surface of a forward end portion of the housing 110 located forward of the displacement member 300 and the outer circumferential surface of the heater 200;

accordingly, the progress of such adhesion and accumulation leads to clogging of the space K (combustion-chamber-side space KA) with soot. Additionally, functioning as an adhesive, such soot may affix the heater 200 to the housing 110. Meanwhile, in the case where soot particles (particle size) are large and are thus unlikely to enter the above-mentioned space K, as indicated by black dots in the enlarged view (at the left in the enlarged view) of FIG. 10, soot adheres to and accumulates on the heater 200 at a rear end portion of its protruding portion protruding forward from the opening of the forward end 136 of the housing 110 (the corner defined by the outer circumferential surface of the rear end portion and the forward end surface of the housing 110), thereby blocking, at the forward end 136 of the housing 110, the space K located rearward of the rear end portion. As a result, the displacement member 300 fails to receive combustion pressure; thus, deformation of the displacement member 300 is hindered, resulting in deterioration in combustion pressure sensing performance. In this manner, a conventional glow plug has involved a problem of deterioration in sensing performance resulting from generated soot remaining within the above-mentioned space and adhering to and accumulating on the rear end portion of the protruding portion protruding from the forward end of the housing.

The present invention has been conceived to prevent deterioration in combustion pressure sensing performance resulting from adhesion, accumulation, and the like of soot in a glow plug with a combustion pressure sensor, and an object of the present invention is to provide a glow plug with a combustion pressure sensor which can efficiently remove such soot.

Means for Solving the Problem

An invention described in claim 1 provides a glow plug with a combustion pressure sensor comprising a rodlike ceramic heater having a forward heat-generating element provided at a forward end portion and adapted to generate heat through application of electricity, a tubular housing having the ceramic heater disposed therein with a forward end of the ceramic heater protruding forward from a forward end thereof, and a sensor capable of sensing combustion pressure by detecting pressure or displacement generated as a result of the ceramic heater being pressed rearward at the forward end by the combustion pressure, an inner circumferential surface of a forward end portion of the housing and an outer circumferential surface of the ceramic heater defining an annular space communicating with an opening in a forward end of the housing, and the space accommodating a displacement member joined along a circumferential direction to the housing and to the ceramic heater and being deformable so as to allow axial displacement of the ceramic heater, the glow plug being characterized in that the ceramic heater has a rear heat-generating element adapted to generate heat through application of electricity, for heating at least a portion of the outer circumferential surface of the ceramic heater in an axial region between a rear end portion of a protruding portion of the ceramic heater protruding forward from the forward end of the housing and a rear end of the displacement member located rearward of the rear end portion of the protruding portion of the ceramic heater.

An invention described in claim 2 provides a glow plug with a combustion pressure sensor comprising a rodlike ceramic heater having a forward heat-generating element provided at a forward end portion and adapted to generate heat through application of electricity, a tubular housing having the ceramic heater disposed therein with a forward end of the ceramic heater protruding forward from a forward end thereof, and a sensor capable of sensing combustion pressure by detecting pressure or displacement generated as a result of the ceramic heater being pressed rearward at the forward end by the combustion pressure, an inner circumferential surface of a forward end portion of the housing and an outer circumferential surface of the ceramic heater defining an annular space communicating with an opening in a forward end of the housing, and the space accommodating a displacement member joined along a circumferential direction to the housing and to the ceramic heater and being deformable so as to allow axial displacement of the ceramic heater, the glow plug being characterized in that the ceramic heater has a rear heat-generating element formed of a resistance heat-generating element, adapted to generate heat through application of electricity, and provided in an axial region between a rear end portion of a protruding portion of the ceramic heater protruding forward from the forward end of the housing and a rear end of the displacement member located rearward of the rear end portion of the protruding portion of the ceramic heater.

An invention described in claim 3 provides a glow plug with a combustion pressure sensor according to claim 1 or 2, wherein the axial region is an axial region between the forward end of the housing and the rear end of the displacement member located rearward of the forward end of the housing.

An invention described in claim 4 provides a glow plug with a combustion pressure sensor according to any one of claims 1 to 3, wherein the rear heat-generating element is provided in such a manner as to be electrically connected in parallel with the forward heat-generating element.

An invention described in claim 5 provides a glow plug with a combustion pressure sensor according to claim 4, wherein the rear heat-generating element is provided in an electrically insulative ceramic base member of the rodlike ceramic heater in such a manner as to connect axially intermediate portions of a pair of lead elements provided for application of electricity and extending rearward from the forward heat-generating element.

An invention described in claim 6 provides a glow plug with a combustion pressure sensor according to claim 4, wherein the rear heat-generating element is provided in an electrically insulative ceramic base member of the rodlike ceramic heater in such a manner as to connect forward ends or forward end portions of a pair of lead elements extending rearward and provided separately from the pair of lead elements provided for application of electricity and extending rearward from the forward heat-generating element.

An invention described in claim 7 provides a glow plug with a combustion pressure sensor according to any one of claims 4 to 6, wherein the rear heat-generating element is formed of a resistance heat-generating element higher in resistance than that used to form the forward heat-generating element.

An invention described in claim 8 provides a glow plug with a combustion pressure sensor according to any one of claims 1 to 3, wherein, in order for the rear heat-generating element to be electrically connected in series with the forward heat-generating element, the rear heat-generating element is provided in an electrically insulative ceramic base member of the rodlike ceramic heater in such a manner that the rear heat-generating element is located in an axially intermediate portion of each of a pair of lead elements provided for application of electricity and extending rearward from the forward heat-generating element and the rear heat-generating element connects portions of the corresponding lead element, which portions are located forward and rearward of the axially intermediate portion.

An invention described in claim 9 provides a glow plug with a combustion pressure sensor according to claim 8, wherein the rear heat-generating element is formed of a resistance heat-generating element lower in resistance than that used to form the forward heat-generating element.

An invention described in claim 10 provides a glow plug with a combustion pressure sensor according to any one of claims 1 to 9, wherein the annular space communicating with the opening in the forward end of the housing comprises a space which is relatively narrow in a radial direction of the housing and is located toward the forward end and a space which is relatively wide in the radial direction and is located rearward of the narrow space, and, in the wide space, the displacement member is joined to the housing.

Effect of the Invention

Soot or a particulate substance generated in the process of combustion of a diesel engine enters an annular space between the outer circumferential surface of a ceramic heater and the inner circumferential surface of a forward end portion of the housing of a glow plug with a combustion pressure sensor from an opening in the forward end of the housing and adheres to and accumulates on the inner circumferential surface, the outer circumferential surface, and a displacement member. In such a case, in the glow plug of the present invention, in addition to application of heat from the energized forward heat-generating element, heat from the energized rear heat-generating element provided rearward of the forward heat-generating element is applied, thereby yielding an action and effect of removing such soot through burning. Specifically, in order to efficiently generate heat for accelerating ignition, the forward heat-generating element is limited in location of heat generation to the forward end and its vicinity; however, according to the present invention, since application of heat from the rear heat-generating element is available, there is yielded an action and effect of removing, through burning, remaining soot such as soot adhering to the outer circumferential surface of a rear end portion (root portion) of a protruding portion of the ceramic heater protruding forward from the forward end of the housing and adhering soot within the aforementioned space. Thus, the glow plug with a combustion pressure sensor of the present invention effectively prevents impairment in easiness of deformation of the displacement member and blocking and clogging of the space between the outer circumferential surface of the heater and the inner circumferential surface of a forward end portion of the housing, which could otherwise result from such adhesion or the like of soot. As a result, since there can be eliminated soot-related cause for hindrance to axial displacement (movement) of the heater, deterioration in combustion pressure sensing performance can be prevented. Incidentally, the temperature of heat generated by the rear heat-generating element may be determined according to properties, etc., of soot so as to yield the effect of burning soot.

Regarding the form of adhesion and remaining of soot, in the case of small soot particles, soot is apt to enter the aforementioned space at an axially deep position. However, in the case where the space between the outer circumferential surface of the ceramic heater and the inner circumferential surface of the forward end of the housing is small in a radial dimension, or soot particles are relatively large, soot is apt to adhere to the outer circumferential surface of a rear end portion of the protruding portion of the ceramic heater protruding forward from the forward end of the housing. Thus, the rear heat-generating element may be provided in the ceramic heater at an axial position which is determined according to the shape, size, etc., of the aforementioned space, so as to intensively or efficiently heat the outer circumferential surface of that portion of the heater to which soot is apt to adhere. Therefore, as in the case of the invention described in claim 2, the rear heat-generating element may be provided, in view of the tendency of soot adhesion, in an axial region between a rear end portion of a protruding portion of the ceramic heater protruding forward from the forward end of the housing and the rear end of the displacement member located rearward of the rear end portion of the protruding portion of the ceramic heater. Thus, the rear heat-generating element is not necessarily provided along the entire axial region, but may be provided in at least a portion of the axial region. If adhesion of soot to the outer circumferential surface of the aforementioned rear end portion is minor, as in the case of the invention described in claim 3, the rear heat-generating element may be provided as mentioned above in the axial region between the forward end of the housing and the rear end of the displacement member located rearward of the forward end of the housing.

Also, in order to enhance the efficiency of removing soot adhering to the displacement member through burning, the efficiency of heating the displacement member must be enhanced; therefore, it is preferred that the rear heat-generating element be provided at a position where thermal conduction to the displacement member is excellent. Specifically, preferably, the rear heat-generating element is provided at a position corresponding to the connection of the displacement member to the ceramic heater side or at a position near the connection. However, the number of the rear heat-generating elements to be provided along the axial direction in the present invention is not limited to one. In the case where the axial region (range) of a portion to which soot is apt to adhere and remain is long, a plurality of the rear het-generating elements may be provided.

Incidentally, the forward heat-generating element of the ceramic heater of the glow plug is required to generate heat at a temperature of about 1,300° C.; however, although it depends on components of soot, soot can usually be burned at about 400° C., so that the resistance, etc., of the rear heat-generating element may be determined to provide such heating. In the case where the rear heat-generating element is to be provided electrically in parallel with the forward heat-generating element as described in claim 4, such parallel connection is implemented as described in claim 5 or 6. In the case where the rear heat-generating element is provided electrically in parallel with the forward heat-generating element, as described in claim 7, in order to obtain a desired heating temperature, the resistance of a resistance heat-generating element used to form the rear heat-generating element is rendered higher than the resistance of a resistance heat-generating element used to form the forward heat-generating element. In the case where the resistance heat-generating element is formed of electrically conductive ceramic prepared by mixing in, for example, tungsten powder, such resistance may be attained by adjusting the amount of tungsten to be added. By means of the rear heat-generating element being electrically connected in parallel with the forward heat-generating member, the rear heat-generating element can be provided without involvement of deterioration in the amount of heat generated by the forward heat-generating element.

Meanwhile, as described in claim 8, the rear heat-generating element may be connected electrically in series with the forward heat-generating element. In order to attain the above-mentioned temperature in the case of the series connection, contrary to the case of the parallel connection, as described in claim 9, the resistance of a resistance heat-generating element used to form the rear heat-generating element is rendered lower than the resistance of a resistance heat-generating element used to form the forward heat-generating element. Such series connection is preferred for the case of employment of a thin ceramic heater.

The shape and structure of the inner circumferential surface of a forward end portion of the housing vary depending on the shape and structure of the displacement member, a means of joining the displacement member to its counterpart (the housing or the ceramic heater), etc., however, it is preferred, as described in claim 10, that the annular space communicating with the opening in the forward end of the housing comprise a space which is relatively narrow and is located toward the forward end and a space which is relatively wide and is located rearward of the narrow space, and, in the wide space, the displacement member be joined to the housing.

MODES FOR CARRYING OUT THE INVENTION

Figure 1:
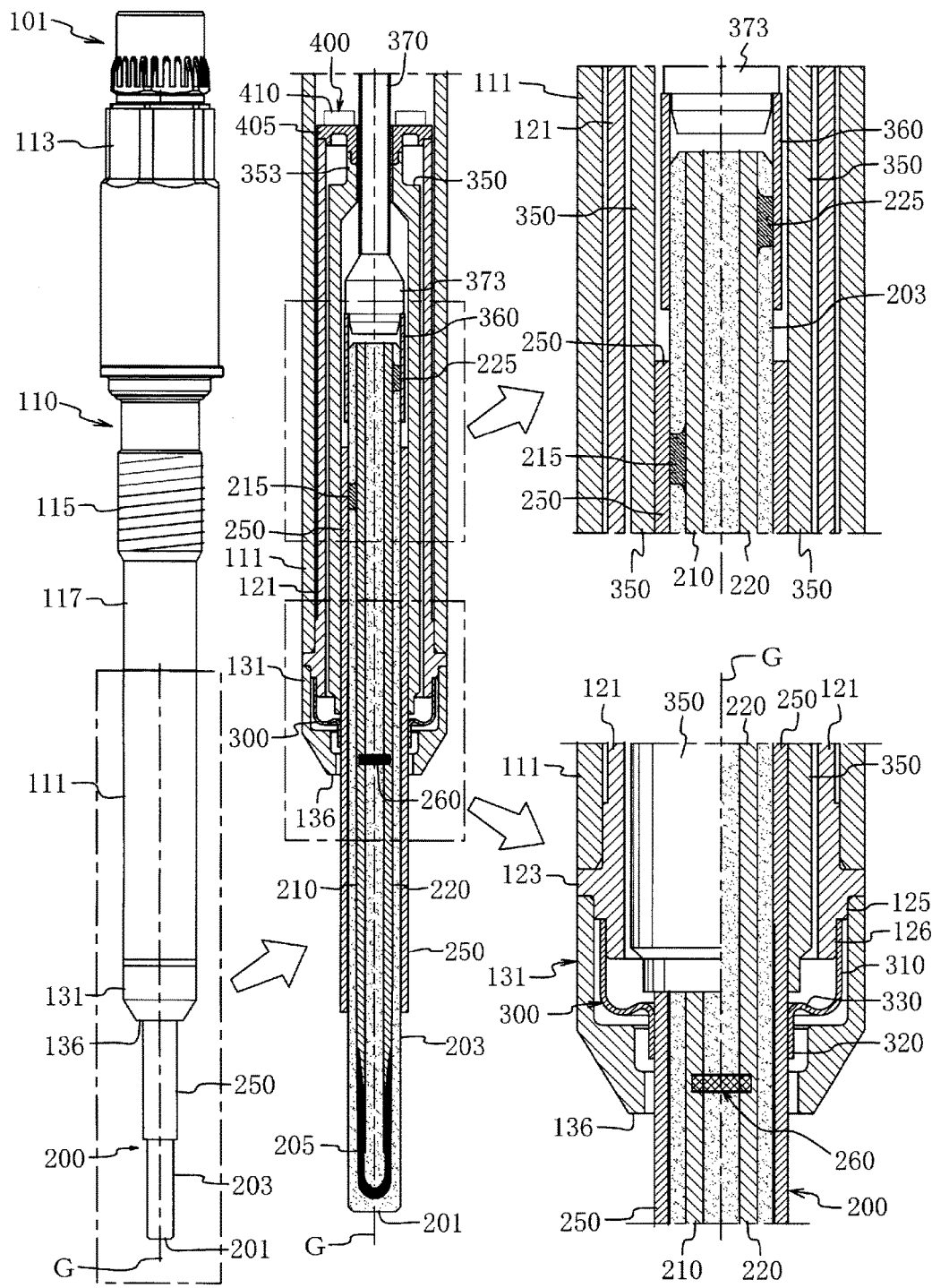
FIG. 1 is a front view and fragmentary, enlarged longitudinal sectional view of a glow plug with a combustion pressure sensor according to an embodiment (first embodiment) of the present invention, and further enlarged views of portions of the sectional view.

A glow plug with a combustion pressure sensor according to an embodiment (first embodiment) of the present invention will be described with reference to FIGS. 1 to 3. A glow plug 101 of the present embodiment includes a substantially cylindrical housing 110; a ceramic heater 200 disposed in the housing 110 with its forward end (an illustrated lower end) 201 protruding from a forward end 136 of the housing 110; a displacement member 300 provided between the outer circumferential surface of the heater 200 and the inner circumferential surface of a forward end portion of the housing 110; and a combustion pressure sensor (hereinafter, may be called merely a sensor) 400 disposed rearward of the ceramic heater 200. In the present embodiment, the sensor 400 includes a distortion member 405 and a strain sensor element (hereinafter, called a sensor element) 410. The ceramic heater 200 includes a ceramic base member 203 having a shape resembling a round bar, and a metal pipe 250 which is, for example, externally press-fitted to the ceramic base member 203 in such a manner as to surround an axially intermediate portion of the ceramic base member 203, and protrudes forward a portion including a forward portion of the pipe 250 from the forward end 136 of the housing 110. The heater 200 will be described in detail later, and, first, the entire configuration of the glow plug 101 is described in detail.

In the present embodiment, the housing 110 is composed of three members; specifically, a substantially cylindrical housing body 111; a sensor-supporting inner housing 121 which is inserted coaxially into the housing body 111 and disposed in such a manner as to support the sensor 400 at the rear end of the heater 200; and a forward end housing 131 located coaxially at the forward end of the housing body 111. The housing body 111 includes a screwing polygonal portion 113 formed at a rear end portion of the outer circumferential surface thereof and used for screwing the housing body 111 into a cylinder head, and a screw 115 located forward of the polygonal portion 113 and used for threading engagement. The housing body 111 has a cylindrical tube portion 117 located forward of the screw 115 and having a diameter slightly smaller than the minor diameter of the screw 115. The sensor-supporting inner housing 121 is inserted into and disposed in the cylindrical tube portion 117.

The sensor-supporting inner housing 121 is a cylindrical tube having an outside diameter slightly smaller than the inside diameter of the housing body 111 and includes a flange 123 protruding from the outer circumferential surface of a forward end portion thereof. The flange 123 has the same outside diameter as that of the cylindrical tube portion 117 of the housing body 111, and, as shown in FIG. 2, the rearward-oriented surface of the flange 123 is brought into contact with the forward end of the housing body 111 and fixed through, for example, welding. The black triangles in FIG. 2 indicate welds.

As shown in an enlarged view in FIG. 1, the distortion member 405 having an annular diaphragm with a center opening is welded to the rear end of the sensor-supporting inner housing 121 through the forward end of an annular portion provided coaxially on the outer forward-oriented surface thereof. The rear end of a diameter-reduced tube portion 353 located at a rear end portion of the displacement-transmitting hollow shaft member 350 externally fixedly fitted to the outer circumferential surface of the heater 200 is, inside the sensor-supporting inner housing 121, brought in coaxial contact with and welded to the forward end of a tubular portion provided coaxially on the inner forward-oriented surface (the forward-oriented surface of an annular inner portion) of the distortion member 405. The displacement-transmitting hollow shaft member 350 is disposed with a gap held in relation to the sensor-supporting inner housing 121.

The displacement-transmitting hollow shaft member 350 is welded, at its forward end, to the metal pipe (circular tube) 250 externally fitted and fixed to the round-bar-like ceramic base member 203 of the ceramic heater 200 in the vicinity of (at a position located slightly forward of) the forward end of the sensor-supporting inner housing 121. Meanwhile, the sensor element 410 is attached to the rearward-oriented surface of an annular-plate-like diaphragm of the distortion member 405. Thus, upon occurrence of movement of the heater 200 along the axis G (axial movement caused by combustion pressure), in response to movement of the displacement-transmitting hollow shaft member 350 provided unitarily with the heater 200, the annular-plate-like diaphragm of the distortion member 405 is deformed axially; in response to the deformation, the sensor element 410 is deformed; and a change in resistance resulting from the deformation of the sensor element 410 is output in the form of an electric signal. A signal generated in response to a change in resistance is output to an external ECU through unillustrated wiring lines, whereby the ECU senses combustion pressure and controls a fuel injection system, etc., accordingly.

The sensor-supporting inner housing 121 has a short cylindrical portion 125 located forward of the flange 123, and a small cylindrical portion 126 provided at the forward end of the short cylindrical portion 125 and having a small outside diameter, and, in the present embodiment, the outer circumferential surface of the small cylindrical portion 126 is a connection of the displacement member 300 to the housing 110 side. In the present embodiment, the displacement member 300 has the form of a diameter-differed cylinder such that a forward portion has a small diameter, while a rear portion has a large diameter, and the rear large-diameter portion (large-diameter cylindrical portion) 310 is externally fitted to and welded circumferentially to the small cylindrical portion 126 in a sealed condition. The forward end housing 131 is coaxially fixed to the forward-oriented surface (annular surface) of the flange provided on the outer circumferential surface of a forward end portion of the sensor-supporting inner housing 121. Specifically, as shown in FIG. 2, a tubular portion 133 of the forward end housing 131 has the same outside diameter as that of the flange 123 and an inside diameter on the rear end side which allows the tubular portion 133 to be fitted to the short cylindrical portion 125; is coaxially fitted to the short cylindrical portion 125; and is fixed to the forward-oriented surface (annular surface) by welding. The inside diameter of the forward end housing 131 is such that a rearward portion has a large inside diameter, whereas a forward portion has a small inside diameter, and the rearward portion and the forward portion are coaxial and have a circular cross section. The forward end housing 131 is such that a rearward portion is the tubular portion (cylindrical portion) 133, whereas a portion located forward of the tubular portion 133 is a taper tube portion 135 whose outer circumferential surface is a taper surface which tapers forward, and the taper surface comes in press contact with the taper seat surface of an engine head in screwing the plug into a plug hole of the engine head.

Figure 2:
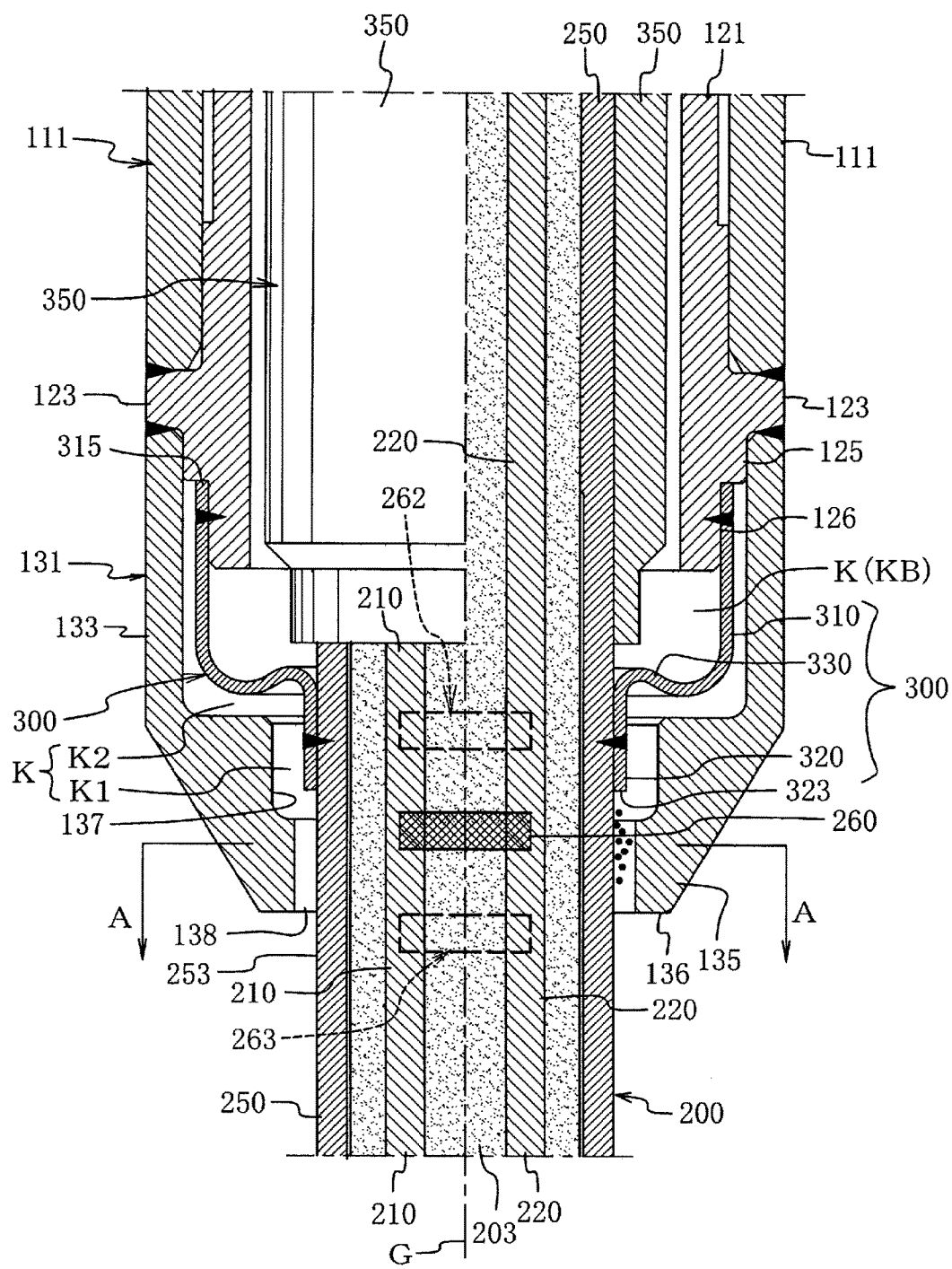
FIG. 2 is an enlarged view of the lower right view of FIG. 1, showing essential portions of the glow plug.
Figure 3:
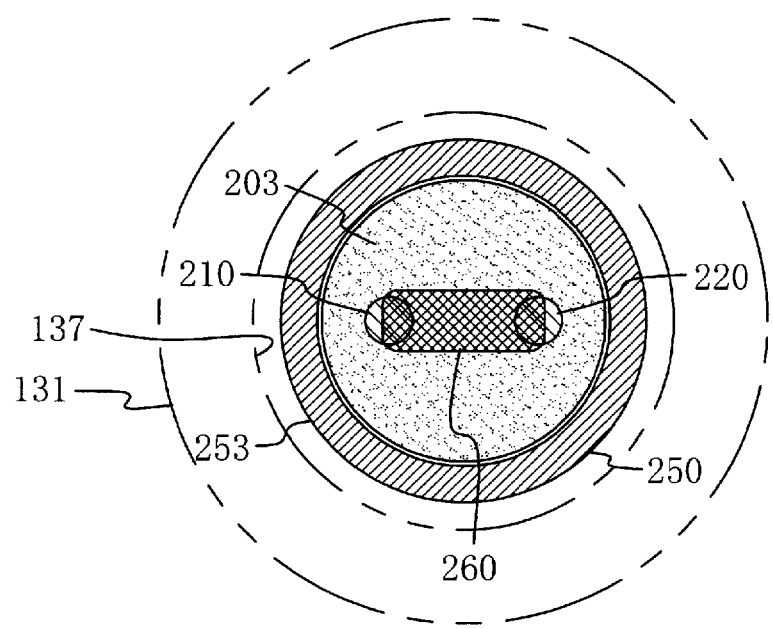
FIG. 3 is a sectional view taken along line A-A of FIG. 2.

In the present embodiment, as shown in FIG. 2, an outer circumferential surface 253 of the heater 200 and an inner circumferential surface 137 of the forward end housing 131, or a forward end portion including the forward end 136 of the housing 110, radially define a space (hereinafter, may be called the annular space) K, and the space K has a small diameter at the forward side and a large diameter at the rear side so as to be composed of a relatively narrow forward space K1 and a relatively wide rear space K2. The forward ends of the sensor-supporting inner housing 121 and the displacement-transmitting hollow shaft member 350 are located in the annular space K, and the large-diameter cylindrical portion 310 of the displacement member 300 is located in the wide space K2. A small-diameter cylindrical portion 320 of the displacement member 300 is externally fitted and circumferentially welded, in a sealed condition, to the outer circumferential surface 253 of the heater 200 (the outer circumferential surface of the metal pipe 250), while the forward end thereof is inserted into the narrow space K1. However, in order to cope with accommodation of the small-diameter cylindrical portion 320, the inside diameter (the diameter of the inner circumferential surface) of a forward end portion having the small inside diameter of the forward end housing 131 is slightly expanded at a rear end portion of the forward end portion.

Even though combustion gas passes through an opening 138 of the forward end 136 of the forward end housing 131; i.e., through the narrow annular space K1 between the inner circumferential surface 137 of the forward end 136 and the outer circumferential surface 253 of the heater 200, and enters the wide annular space K2 located axially deeper than the annular space K1, since the displacement member 300 is provided in such a manner as to axially block the space K, combustion gas does not enter a rearward space KB located rearward of the displacement member 300. In response to the displacement of the heater 200 along the axis G, the displacement member 300 is deformed in such a manner that, of a circular plate portion 330 extending between the rear large-diameter cylindrical portion 310 and the forward small-diameter cylindrical portion 320, mainly a portion located toward the small-diameter cylindrical portion 320 moves forward or rearward so as to allow the displacement of the heater 200. The displacement member 300 is formed of a heat-resistant, deformable metal membrane.

Next, the ceramic heater 200, which is an essential member of the present invention, will be described in detail. As mentioned above, the heater 200 is composed of the round-bar-like ceramic base member 203 and the metal pipe 250 externally fitted and fixed to the ceramic base member 203 and is disposed coaxially with the housing 110. The pipe 250 may be brazed, but is fixed through press fitting in the present embodiment. The ceramic base member 203 of the heater 200 is formed of electrically insulative ceramic (e.g., silicon nitride or alumina). The forward heat-generating element 205 formed of a resistance heat-generating element (e.g., electrically conductive ceramic which contains silicon nitride as a main component and an electrically conductive material (e.g., tungsten or molybdenum)) which generates heat through application of electricity is embedded in the forward end (forward end portion) 201 of the ceramic heater 200. The forward heat-generating element 205 assumes a folded form (a form resembling letter U) in the forward end portion 201 of the ceramic base member 203. The ceramic base member 203 of the heater 200 has a pair of lead elements 210 and 220 provided therein for application of electricity and extending rearward from respective ends (rear ends) of the resistance heat-generating element of the forward heat-generating element 205. The lead elements 210 and 220 are exposed from the side surface (outer circumferential surface) of a rear end portion of the ceramic base member 203 at axially different positions, thereby forming electrode terminals 215 and 225, respectively.

In an assembled condition of the glow plug 101, the heater 200 has a rear heat-generating element 260 formed of a resistance heat-generating element which generates heat through application of electricity, for heating the outer circumferential surface 253 of the heater 200 in an axial region between a rear end portion of a protruding portion (a portion in the vicinity of the forward end 136 of the housing 110) of the heater 200 protruding forward from the forward end 136 of the housing 110 and a rear end 315 of the displacement member 300 or between the forward end 136 of the housing 110 and the rear end 315 of the displacement member 300. The rear heat-generating element 260 is provided in the axial region between the forward end 136 of the housing 110 and the rear end 315 of the displacement member 300 at a position located between the forward end 136 of the housing 110 and a forward end 323 of the displacement member 300 located rearward of the forward end 136 and is electrically connected in parallel with the forward heat-generating element 205 (see FIG. 2). That is, the rear heat-generating element 260 is provided in such a manner as to connect axially intermediate portions, in the axial region, of the pair of lead elements 210 and 220 extending rearward from the forward heat-generating element 205.

In the present embodiment, the lead elements 210 and 220 and the rear heat-generating element 260 are formed of electrically conductive ceramic. However, in order to avoid unnecessary generation of heat, the mixing ratio of tungsten is increased for the lead elements 210 and 220, whereas, in order to generate heat for burning soot, the mixing ratio of tungsten is reduced for a resistance heat-generating element used to form the rear heat-generating element 260. That is, in view of acceleration of ignition of fuel, the forward heat-generating element 205 is required to generate heat of, for example, about 1,300° C., whereas, since it is sufficient for the rear heat-generating element 260 to generate heat for burning soot, in the present embodiment, the rear heat-generating element 260 is formed such that a portion of adhesion of soot to be burned; i.e., the outer circumferential surface 253 of the heater 200 (in the present embodiment, the outer circumferential surface of the pipe 250) in the above-mentioned axial region, has a temperature of, for example, about 400° C. to 500° C. Additionally, in the present embodiment, since the rear heat-generating element 260 is electrically connected in parallel with the forward heat-generating element 205, a resistance heat-generating element used to form the rear heat-generating element 260 is rendered higher in resistance than that used to form the forward heat-generating element 205.

Of the electrode terminals 215 and 225 of a pair of the lead elements 210 and 220 provided at the side surface of a rear end portion of the heater 200, the electrode terminal (grounding terminal) 215 located on the forward side is in press contact with the inner circumferential surface of a rear end portion of the metal pipe 250 externally fitted to the heater 200, thereby being electrically connected to the housing 110 through the pipe 250. Also, the electrode terminal (positive-potential terminal) 225 located at a relatively rear position of the heater 200 is in press contact with and thus electrically connected to the inner circumferential surface of a metal ring 360 which is externally fitted and fixed to the rear end of the heater 200 through press fitting or the like, thereby being electrically connected to an unillustrated external terminal provided rearward of the glow plug 101 through an electrically conductive material (shaft member) 370. However, in the present embodiment, the electrically conductive material 370 assumes the form of a shaft member adapted to apply electricity and disposed in such a manner as to extend rearward while maintaining electrical insulation within the housing 110, and a large-diameter portion 373 at the forward end thereof is fixed to the ring 360 through press fitting or the like, while a small-diameter shaft portion thereof extends through the diameter-reduced tube portion 353 at the rear end of the above-mentioned displacement-transmitting hollow shaft member 350 and through the distortion member 405 in an electrically insulated condition.

In use of the glow plug 101 of the present embodiment mounted to the cylinder head of an engine, pressure of combustion gas (blast); i.e., combustion pressure, causes the heater 200, together with the displacement member 300, to be displaced along the axis G (rearward). Thus, the rear-end diameter-reduced tube portion 353 of the displacement-transmitting hollow shaft member 350 fixed to the heater 200 presses rearward and thus deforms the annular-plate-like diaphragm of the distortion member 405 fixed to the rear end of the sensor-supporting inner housing 121. The sensor element 410 outputs an electric signal indicative of the deformation, whereby the combustion pressure is detected as mentioned above.

In the course of such use of the glow plug 101, soot contained in combustion gas enters the annular space K between the inner circumferential surface 137 of a forward end portion of the housing 110 and the outer circumferential surface 253 of the ceramic heater 200 (pipe 250) through the opening 138 in the forward end 136 of the housing 110 (forward housing 110) and adheres to and accumulates on the inner circumferential surface 137, the outer circumferential surface 253, and the displacement member 300 as indicated by black dots in FIG. 2 (at the right). However, in the present embodiment, the rear heat-generating element 260 is provided in the axial region between the displacement member 300 and the forward end 136 of the forward housing 110. Thus, according to the glow plug 101 of the present embodiment, the forward heat-generating element 205 generates heat for accelerating ignition of fuel; at the same time, the rear heat-generating element 260 generates heat. Accordingly, the outer circumferential surface 253 of the heater 200 corresponding to the rear heat-generating element 260 is heated. That is, the present embodiment yields an action and effect of removing soot which is to adhere to or adheres to the outer circumferential surface of the heater 200, the displacement member 300, etc., through burning with the generated heat. In this manner, by virtue of provision of the rear heat-generating element 260, as compared with the conventional glow plug 101 not provided with the rear heat-generating element 260, the present embodiment can reduce adhesion and accumulation of soot in the aforementioned axial region and thus can yield an action and effect of preventing impairment in easiness of deformation of the displacement member 300 and easiness of displacement of the heater 200, which could otherwise result from the progress of such adhesion and accumulation of soot, thereby preventing deterioration in accuracy in sensing combustion pressure.

The axial position and size of the rear heat-generating element 260 in the heater 200 may be determined so as to be capable of efficiently burning and removing soot which enters the space K. The shape of the space K and axial and other dimensions of the space K vary depending on design (type) of the glow plug, and portions where soot is likely to adhere and accumulate also vary depending on the design; thus, the axial position, etc., of the rear heat-generating element 260 may be determined so as to efficiently burn and remove such soot. For example, in the case where mainly adhesion of soot to the displacement member 300 is to be solved, as indicated by a rear heat-generating element 262 illustrated in FIG. 2 by the broken line, the rear heat-generating element 260 is provided near the connection of the displacement member 300 to the heater 200. In the case where soot is unlikely to enter the space K, since soot has a relatively large particle size, as mentioned above, soot is apt to adhere to the outer circumferential surface 253 of a rear end portion (root) of a protruding portion of the heater 200 protruding forward from the forward end 136 of the housing 110 (forward housing 110) and to block the opening 138 which is formed in the forward end 136 of the housing 110 around the outer circumferential surface 253 of the heater 200. In such a case, as indicated by a rear heat-generating element 263 illustrated in FIG. 2 in the vicinity of the opening 138 by the broken line, the rear heat-generating element 260 is provided at a position corresponding to the rear end portion (root).

Furthermore, in the case of a large (long) axial region where soot adheres and accumulates, a plurality of the rear heat-generating elements 260, 262, and 263 may be provided, or the temperature of heat to be generated may be increased. By contrast, in the case of a small (short) axial region where soot adheres and accumulates, the rear heat-generating element 260 may be provided in at least a portion susceptible to soot adhesion of the axial region between the forward end 136 of the housing 110 or a rear end portion of a protruding portion of the heater 200 protruding forward from the forward end 136 and the rear end 315 of the displacement member 300 located rearward of the rear end portion. That is, since the axial region where soot adheres and accumulates varies depending on its size, the sectional shape of the displacement member, etc., the rear heat-generating element may be provided according to design of these parameters so as to efficiently burn and remove soot which adheres and accumulates within the space.

Figure 4:
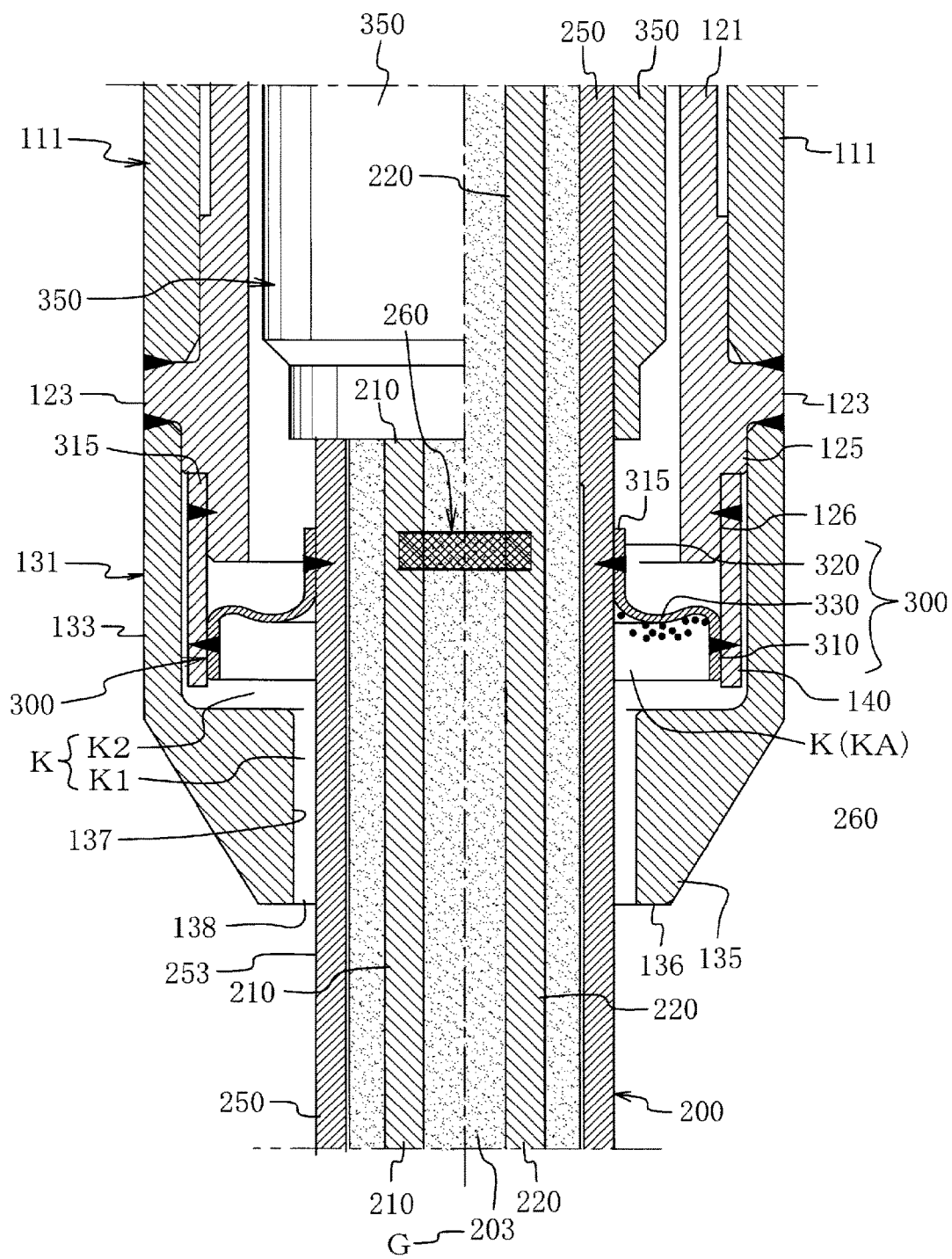
FIG. 4 is an enlarged sectional view showing essential portions for explaining another example position of a rear heat-generating element to cope with a change in the sectional shape of a displacement member.
Figure 5:
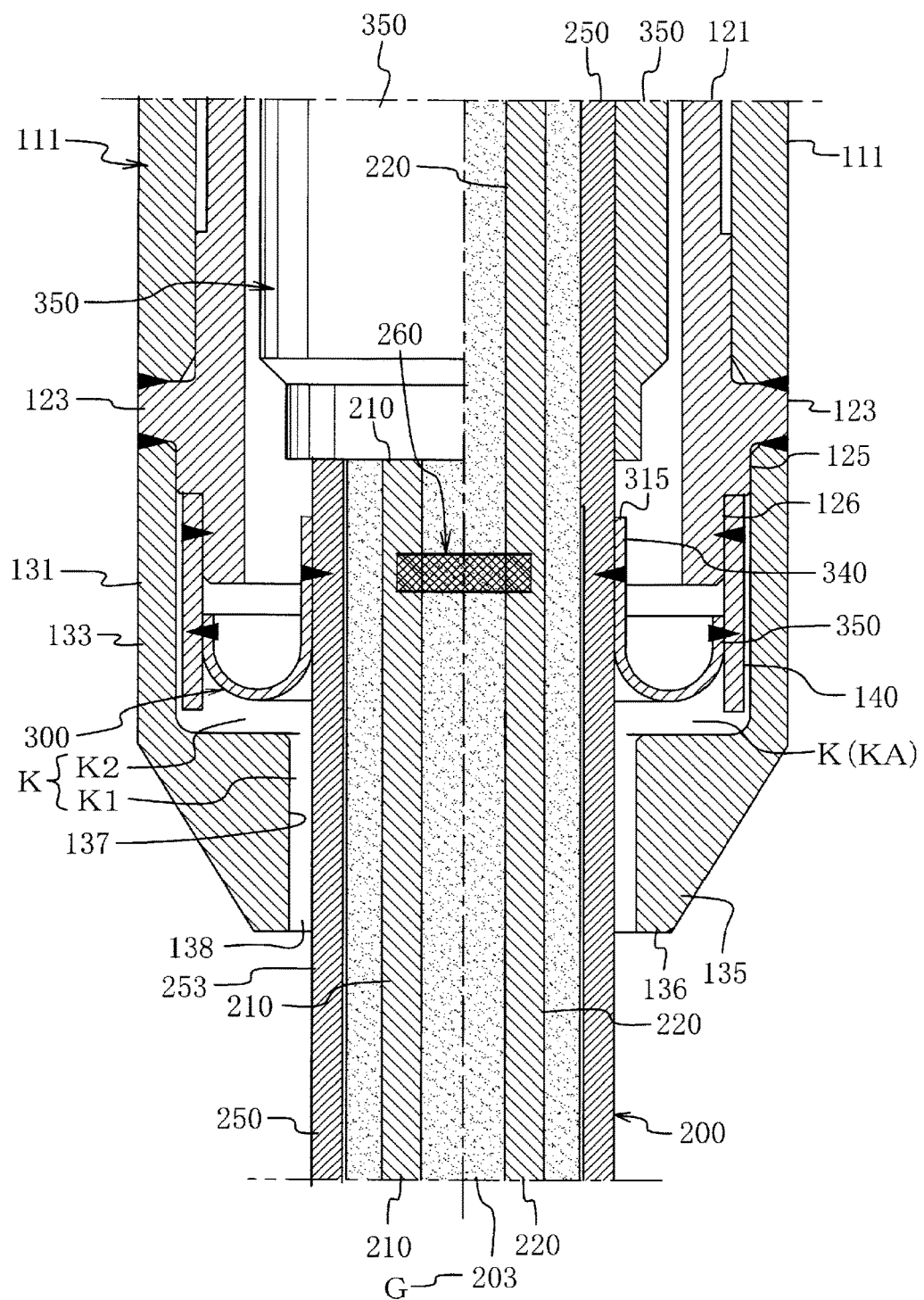
FIG. 5 is an enlarged sectional view showing essential portions for explaining still another example position of the rear heat-generating element to cope with a change in the sectional shape of the displacement member.

In the cases shown in FIGS. 4 and 5, it is preferred that the rear heat-generating element 260 be provided at a position corresponding to the rear end 315 of the displacement member 300 (or a position near the rear end 315). The following embodiments differ from the above embodiment substantially only in the sectional shape of the displacement member, the associated disposition of the displacement member, and the structure of connection; therefore, only points of difference will be described while like components and like portions are denoted by like reference numerals. Specifically, the displacement member 300 in FIG. 4 assumes the reverse form of that of the above embodiment; i.e., the form of a diameter-differed cylinder in which a forward portion has a large diameter, while a rear portion has a small diameter; in the case of such the diameter-differed cylindrical displacement member 300, the rear small-diameter cylindrical portion 320 is joined to the outer circumferential surface 253 of the heater 200; therefore, the connection is a rear end portion of the displacement member 300. The large-diameter cylindrical portion 310 is a forward end portion and is joined to the housing (forward housing) 111 side. In the case where, as illustrated in FIG. 4 by black dots, soot enters axially deep into the space K and adheres to the circular plate portion 330 extending between the large-diameter cylindrical portion 310 and the small-diameter cylindrical portion 320 of the displacement member 300, conduction of heat generated by the rear heat-generating element 260 to the circular plate portion 330 is important. Therefore, in this case, it is preferred that the rear heat-generating element 260 be provided at a position corresponding to the rear end 315 of the displacement member 300 (or a position near the rear end 315) or a position near the weld zone of the rear end 315. In FIG. 4, the 300 large-diameter cylindrical portion 310 of the displacement member is welded to the inner circumferential surface of a forward end portion of a pipe (circular tube) 140 externally fitted and welded to the small cylindrical portion 126 extending from the forward end of the short cylindrical portion 125 of the sensor-supporting inner housing 121, thereby being fixed to the housing (forward housing 131) through the pipe 140.

The displacement member 300 in FIG. 5 may be said to be a modification of that in FIG. 4; specifically, the displacement member 300 has a forward convex sectional shape resembling the letter U or J; the displacement member 300 is joined to the heater 200 and to the housing (forward housing) 111 side at leg portions 340 and 350, respectively, in the section; and the leg portion 340 located toward the heater 200 is long and is welded at a rear end portion thereof to the heater 200. In this case, in order to efficiently burn soot adhering to and accumulating on the displacement member 300 (soot adhering to and accumulating on the forward convex surface), in view of thermal conduction from the rear heat-generating element 260 to the displacement member 300, it is desirable to efficiently heat a rear portion (particularly, a welded portion) of the displacement member 300; therefore, it is preferred that the rear heat-generating element 260 be disposed at an axial position near the welded portion. In this case also, similar to the case of the preceding embodiment, the displacement member 300 is joined to the housing (forward housing) 111 side through the pipe 140.

Figure 6:
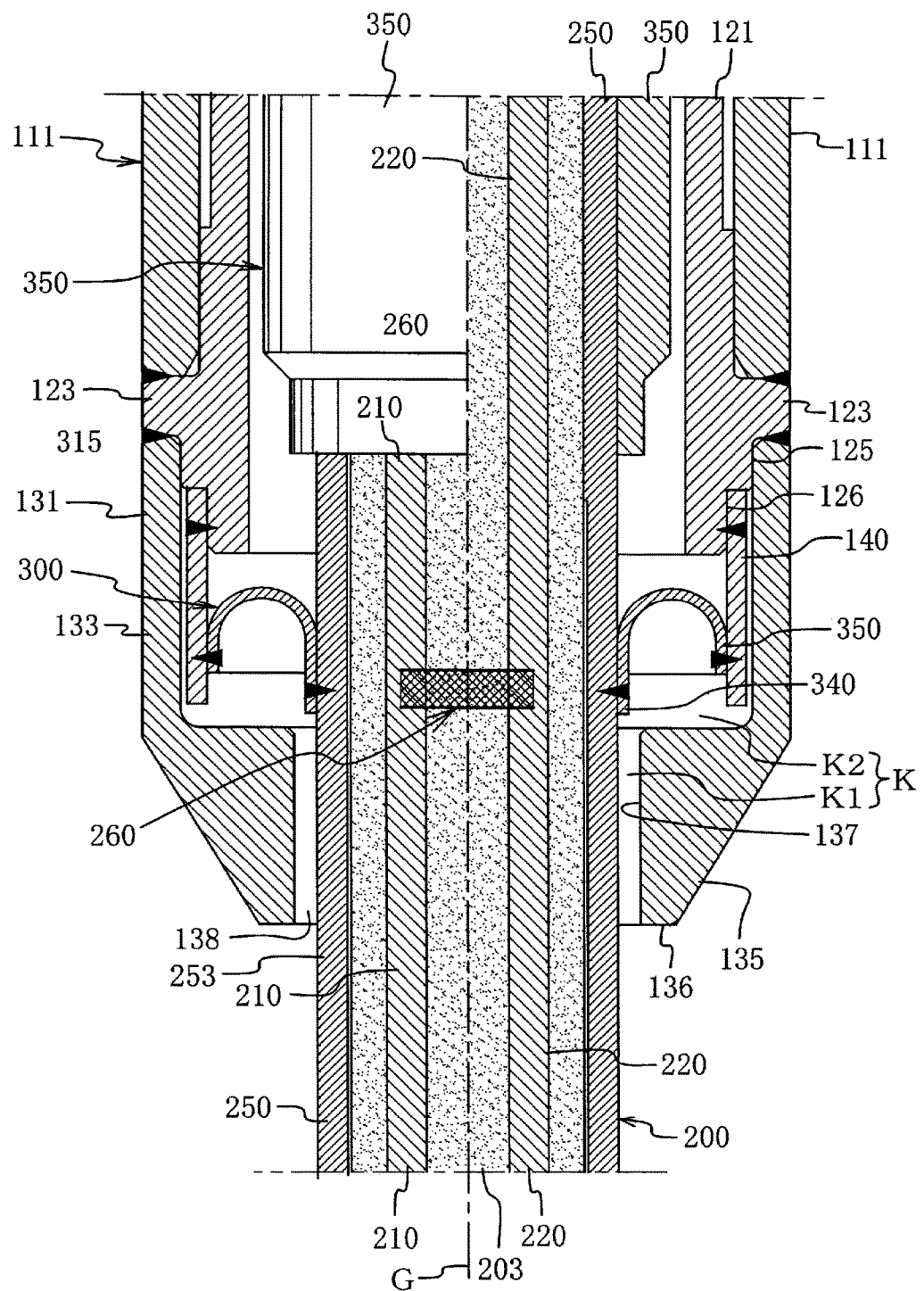
FIG. 6 is an enlarged sectional view showing essential portions for explaining a further example position of the rear heat-generating element to cope with a change in the sectional shape of the displacement member.

As is apparent from the above description, in order to efficiently burn soot adhering to and accumulating on the displacement member 300 in the embodiment shown in FIG. 2, it is preferred that the rear heat-generating element 260 be provided at a position near the weld zone where a forward end portion of the displacement member 300 is welded to the heater. Also, in the case where, as shown in FIG. 6, the displacement member 300 assumes the reverse form of that shown in FIG. 5; i.e., where the displacement member 300 has a rearward convex sectional shape resembling the letter U or J, the displacement member 300 is joined to the heater 200 and to the housing (forward housing) 111 side at the leg portions 340 and 350, respectively, in the section, and the leg portion 340 located toward the heater 200 is long and is welded at a rear end portion thereof to the heater 200, in order to efficiently burn soot adhering to and accumulating on the displacement member 300, it is preferred that the rear heat-generating element 260 be provided at a position corresponding to a forward end portion of the displacement member 300 (particularly, a position near the weld zone of the forward end portion). Incidentally, in the glow plug 101 of this type, the axial dimension (dimension of the axial region) between a rear end portion of a protruding portion of the ceramic heater 200 protruding forward from the forward end 136 of the housing 110 or the forward end 136 of the housing 110 and the rear end 315 of the displacement member 300 located rearward of the forward end 136 depends on the axial length of the displacement member 300, etc., but is usually as small as 5 mm to 10 mm; therefore, even though the rear heat-generating element is provided at any position within the axial region, an action of burning soot adhering and accumulating within the above-mentioned space K is yielded.

Figure 7:
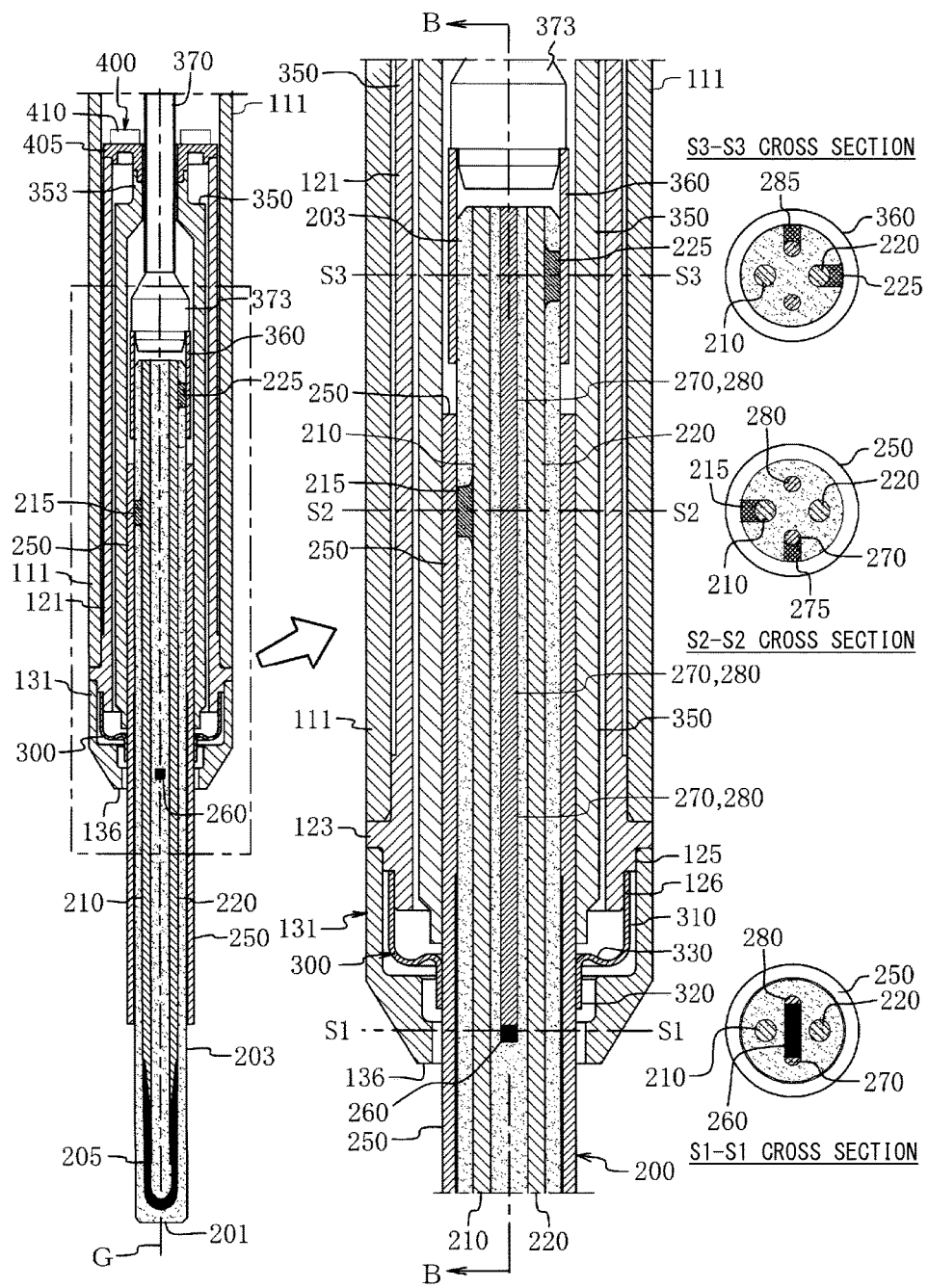
FIG. 7 is a fragmentary, longitudinal sectional view for explaining another embodiment of the glow plug of FIG. 1 in which the rear heat-generating element is electrically connected in parallel with a forward heat-generating element, an enlarged view showing essential portions in the sectional view, and cross-sectional views taken across the enlarged view.
Figure 8:
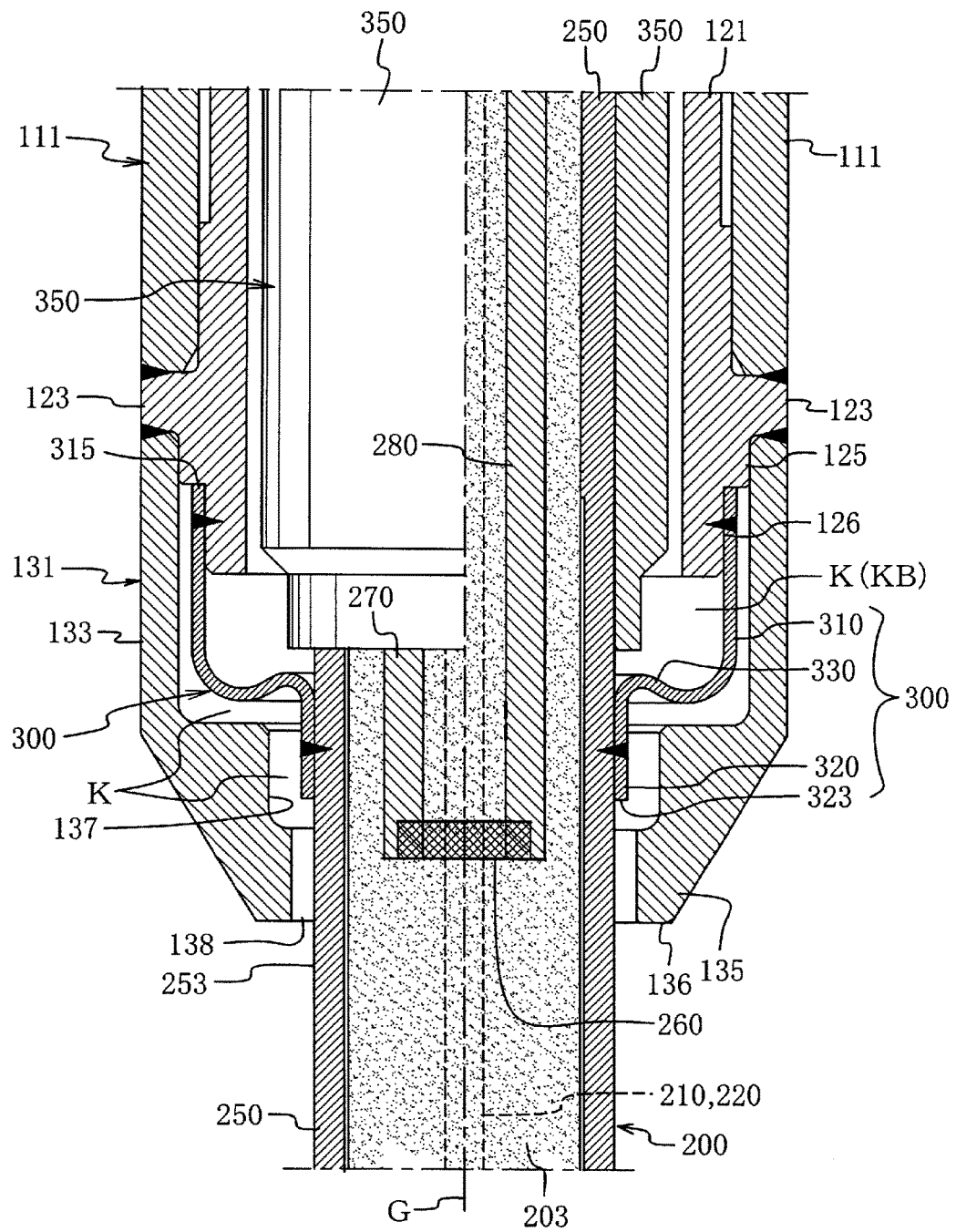
FIG. 8 is an enlarged sectional view of essential portions taken along line B-B of FIG. 7.

In the above embodiments, the rear heat-generating element 260 is provided in such a manner as to be electrically connected in parallel with the forward heat-generating element 205; for such parallel connection, the rear heat-generating element 260 may be provided as represented by an embodiment shown in FIGS. 7 and 8. Specifically, in the present embodiment, the rear heat-generating element 260 is provided in such a manner as to connect the forward ends of a pair of lead elements 270 and 280 extending rearward and provided separately from the pair of lead elements 210 and 220 provided for application of electricity and extending rearward from the forward heat-generating element 205 in the electrically insulative ceramic base member 203 of the rodlike heater 200. In this case, a grounding electrode terminal 275 of one of the lead elements 270 and 280 extending rearward from the rear heat-generating element 260 is exposed at the outer circumferential surface at the same axial position as that of the grounding electrode terminal 215 connected to the forward heat-generating element 205 and is in press contact with the inner circumferential surface of the metal pipe 250, thereby being electrically connected to the metal pipe 250. A positive-potential electrode terminal 285 of the other lead element 280 is exposed at the outer circumferential surface at the same axial position as that of the positive-potential electrode terminal 225 connected to the forward heat-generating element 205 and is in press contact with the inner circumferential surface of the metal ring 360, thereby being electrically connected to the metal ring 360. In the present embodiment, in a cross section (circular) of the heater 200, the paired lead elements 210 and 220 extending rearward from the forward heat-generating element 205 are provided on one diametral line of the cross section symmetrically with respect to the center of the cross section, and the paired lead elements 270 and 280 extending rearward from the rear heat-generating element 260 are provided symmetrically on a straight line (diametral line) orthogonal to the one diametral line. However, these pairs of lead elements can be provided in appropriate disposition in a cross section of the ceramic base member 203 of the heater 200.

Figure 9:
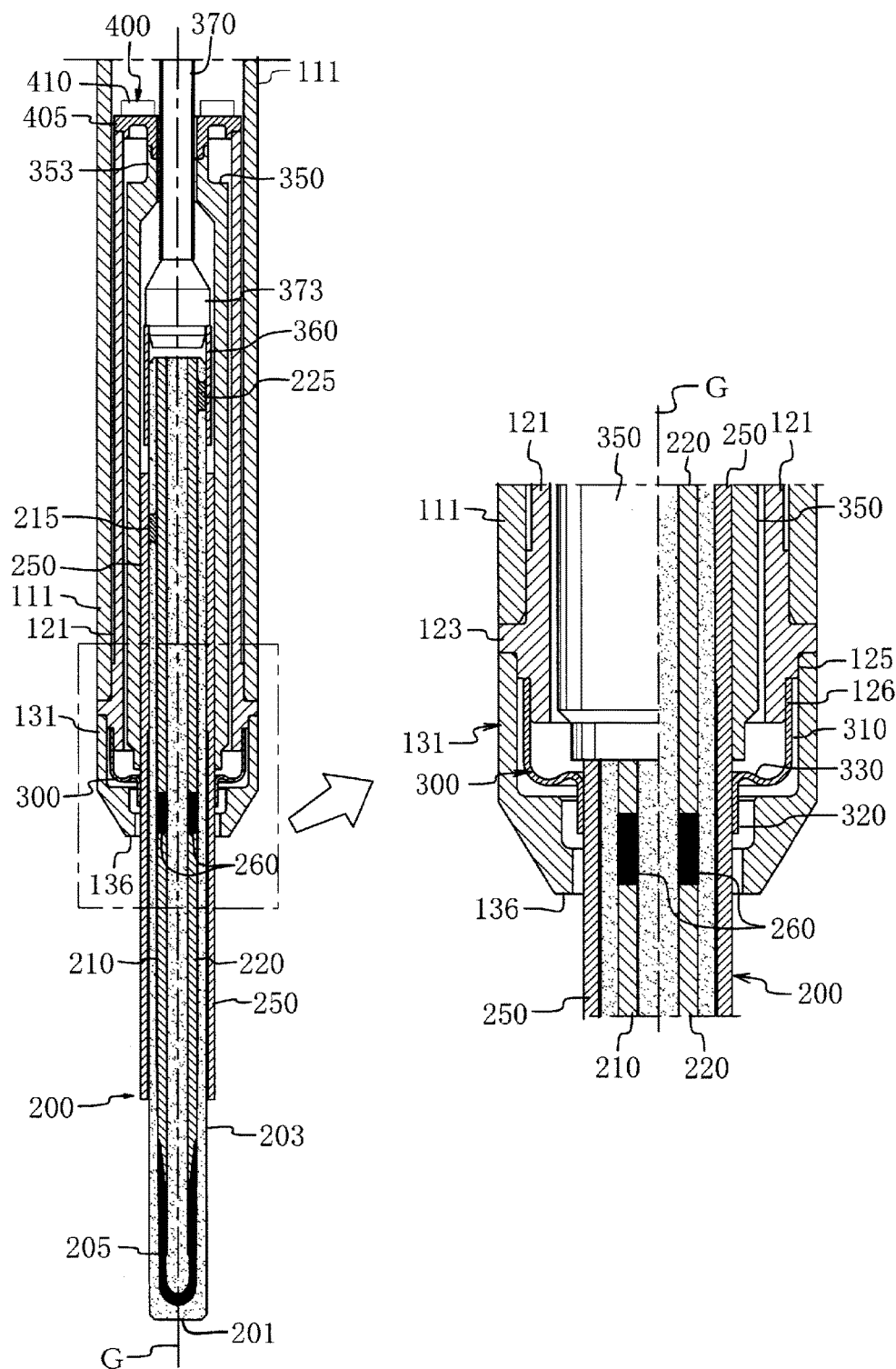
FIG. 9 is a fragmentary, longitudinal sectional view for explaining still another embodiment of the glow plug of FIG. 1 in which the rear heat-generating element is electrically connected in series with the forward heat-generating element, and an enlarged view showing essential portions in the sectional view.
Figure 10:
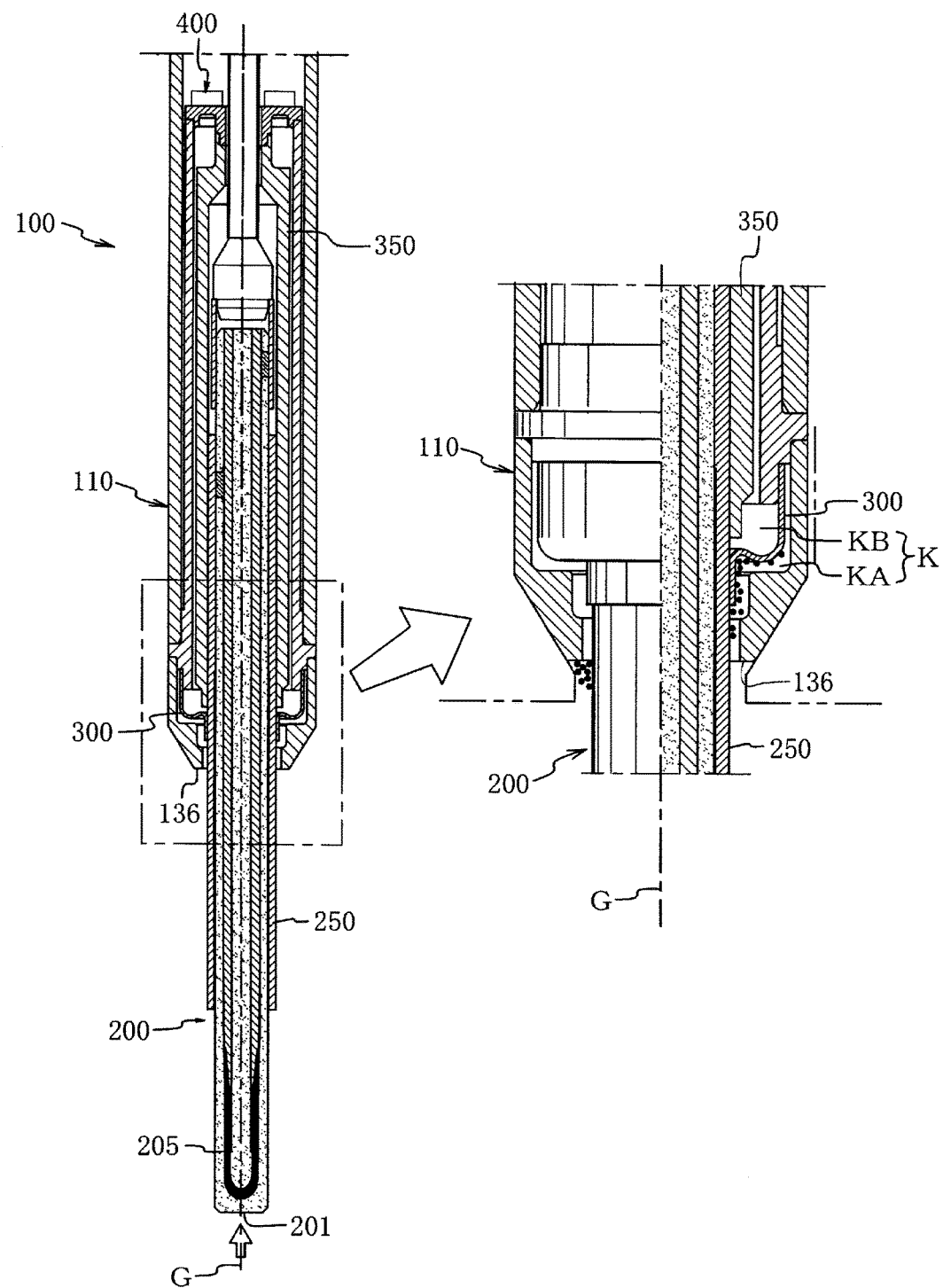
FIG. 10 is a fragmentary, longitudinal sectional view showing an example conventional glow plug with a combustion pressure sensor and an enlarged half sectional view of a region which contains the displacement member.

In the above embodiments, the rear heat-generating element is provided in such a manner as to be electrically connected in parallel with the forward heat-generating element; however, as shown in FIG. 9, the rear heat-generating element may be electrically connected in series. In FIG. 9, the rear heat-generating element is provided in the electrically insulative ceramic base member 203 of the rodlike heater 200 in such a manner that the rear heat-generating element 260 is located in an axially intermediate portion of each of the paired lead elements 210 and 220 provided for application of electricity and extending rearward from the forward heat-generating element 205, and the rear heat-generating element 260 connects portions of the corresponding lead element, which portions are located forward and rearward of the axially intermediate portion. This configuration is suited for the case where, because of the heater 200 having a small diameter (thickness), difficulty is encountered in providing the rear heat-generating element 260 in such a manner as to be electrically connected in parallel with the forward heat-generating element 205. In this configuration, as in the above embodiments, in order for the rear heat-generating element 260 to generate heat lower in temperature than heat generated by the forward heat-generating element 205, the rear heat-generating element 260 may be formed of a resistance heat-generating element lower in resistance than that used to form the forward heat-generating element 205. In this connection, in the case where electrically conductive ceramic is to be used to form the rear and forward heat-generating elements and the lead elements 210 and 220, and tungsten, for example, is used as an electrically conductive material in preparing the electrically conductive ceramic, the mixing ratio of tungsten may be minimized in preparation of electrically conductive ceramic used to form the forward heat-generating element 205; in preparation of electrically conductive ceramic used to form the lead elements 210 and 220 which connect the forward heat-generating element 205 and the rear heat-generating element 260, and to form the lead elements 210 and 220 extending rearward from the rear heat-generating element 260, in order to reduce resistance (voltage) to the greatest possible extent, the mixing ratio of tungsten may be maximized; and in preparation of electrically conductive ceramic used to form the rear heat-generating element 260, in order to efficiently burn soot, the mixing ratio of tungsten may assume an intermediate value therebetween. That is, resistances of the elements may be determined in view of, for example, reduction of power consumption and prevention of oxidization of the electrode terminals 215 and 225, which could otherwise result from unnecessary increase in temperature of a rear portion of the heater 200.

No particular limitation is imposed on the rear heat-generating element, which is an essential element of the present invention, so long as adhering and accumulated soot can be removed through burning with heat generating by the rear heat-generating element; therefore, the rear heat-generating element can be embodied in that having any shape, configuration, etc., as appropriate. Also, the glow plugs 101 of the above embodiments include the ceramic heater 200 and the displacement-transmitting hollow shaft member 350, and the housing 110 is composed of the housing body, the forward housing 110, etc.; however, the glow plug with a combustion pressure sensor of the present invention is not limited thereto, but can be embodied in that having any other appropriate configuration.

Furthermore, in the above embodiments, the annular space K communicating with the opening 138 in the forward end 136 of the housing 110 is composed of the space K1 which is located toward the forward end 136 and is relatively narrow in a radial direction of the housing 110, and the relatively wide space K2 located rearward of the space K1, and, in the wide space K2, the displacement member 300 is joined to the housing 110 side. The above embodiments are described while referring mainly to removal of adhering soot in a region of the space K located forward of the displacement member 300; however, a problem caused by adhesion of soot has no relevance to the shape of the space, but has relevance to allowance of axial move of the heater and arises in a glow plug with a combustion pressure sensor which has a space for proposition of the displacement member. Therefore, the present invention can be widely applied to a glow plug with a combustion pressure sensor which has such a space; for example, the present invention can be widely applied to a glow plug with a combustion pressure sensor in which a space between the outer circumferential surface of the ceramic heater and the inner circumferential surface of a forward end portion of the housing has a dimension in a radial direction of the housing (space dimension) that is fixed along the axial direction.

Also, in the above embodiments, a strain sensor is employed for sensing combustion pressure; however, the present invention is not limited thereto so long as the sensor can sense combustion pressure from pressure with which combustion gas presses the heater rearward, or from an axial displacement (displacement along the axial direction) of the heater. The present invention can be widely applied to a glow plug with a combustion pressure sensor which uses any one of various sensors (sensor elements), such as a semiconductor strain gauge; i.e., a semiconductor device having a piezoelectric resistor, and a sensor which senses a change in voltage generated as a result of compression of a piezoelectric element by combustion pressure. The sensor is not necessarily provided within the housing; i.e., the present invention can be applied to a structure in which the sensor is provided externally of the housing.

Furthermore, in the above embodiments, the ceramic heater has a circular cross section; however, the heater of the present invention can be embodied in a heater having a polygonal cross section such as a quadrangular cross section; i.e., the term "rodlike" in the rodlike heater appearing in the present application conceptually encompasses an axially long member. Also, in the above embodiments, the ceramic heater has the externally press-fitted metal pipe, and the outer circumferential surface of a portion of the heater located in the above-mentioned space corresponds to the outer circumferential surface of the pipe; however, needless to say, the outer circumferential surface of the ceramic base member of the heater may be exposed at a portion of the heater located forward of the connection of the displacement member to the heater. No particular limitation is imposed on the displacement member so long as the displacement member can axially block the above-mentioned space and can allow displacement of the heater. Therefore, the displacement member is not limited to that having different diameters along the axial direction, and various sectional shapes (longitudinal sectional shapes which contain the axial line of the heater) are available for the displacement member; therefore, for example, the present invention can apply to the case of the displacement member in the form of axially long bellows, and the effect of the present invention is yielded.

DESCRIPTION OF REFERENCE NUMERALS

101: glow plug with combustion pressure sensor
110: housing
111: housing body
121: sensor-supporting inner housing
131: forward housing
136: forward end of housing (forward housing)
137: inner circumferential surface of forward end portion of housing (forward housing)
138: opening in forward end of housing (forward end housing)
200: ceramic heater
201: forward end of heater
203: electrically insulative ceramic base member of ceramic heater
205: forward heat-generating element
210, 220: a pair of lead elements for application of electricity
253: outer circumferential surface of ceramic heater (pipe)
260, 262, 263: rear heat-generating element
270, 280: a pair of lead elements for application of electricity
300: displacement member
315: rear end of displacement member
400: sensor
K: annular space

The invention claimed is:

1. A glow plug with a combustion pressure sensor including a sensor element, the glow plug comprising a rodlike ceramic heater, the rodlike ceramic heater comprising a ceramic base member formed of electrically insulative ceramic and a forward heat-generating element of a resistance heat-generating element embedded in a forward end thereof and adapted to generate heat through application of electricity, a tubular housing having the rodlike ceramic heater disposed therein with a forward end of the rodlike ceramic heater protruding forward from a forward end of the tubular housing, and the sensor element capable of sensing combustion pressure by detecting pressure or displacement generated as a result of the rodlike ceramic heater being pressed rearward at the forward end of the rodlike ceramic heater by the combustion pressure, an inner circumferential surface of a forward end portion of the tubular housing and an outer circumferential surface of the rodlike ceramic heater defining an annular space communicating with an opening in a forward end of the tubular housing, and the space accommodating a displacement member joined along a circumferential direction to the tubular housing and to the rodlike ceramic heater and being deformable so as to allow displacement of the rodlike ceramic heater along an axis, the glow plug being characterized in that the rodlike ceramic heater has a rear heat-generating element adapted to generate heat through application of electricity, for heating at least a portion of the outer circumferential surface of the rodlike ceramic heater in an axial region between a rear end portion of a protruding portion of the rodlike ceramic heater protruding forward from the forward end of the tubular housing and a rear end of the displacement member located rearward of the rear end portion of the protruding portion of the rodlike ceramic heater, wherein the rear heat-generating element is formed of an electrically conductive ceramic provided in the electrically insulative ceramic base member of the rodlike ceramic heater, wherein the rear heat-generating element is provided in such a manner as to be electrically connected in parallel with the forward heat-generating element.

2. The glow plug with the combustion pressure sensor as claimed in claim 1, wherein the axial region is an axial region between the forward end of the tubular housing and the rear end of the displacement member located rearward of the forward end of the tubular housing.

3. The glow plug with the combustion pressure sensor as claimed in claim 1, wherein the rear heat-generating element is provided in an electrically insulative ceramic base member of the rodlike ceramic heater in such a manner as to connect axially intermediate portions of a pair of lead elements provided for application of electricity and extending rearward from the forward heat-generating element.

4. The glow plug with the combustion pressure sensor as claimed in claim 1, wherein the rear heat-generating element is provided in an electrically insulative ceramic base member of the rodlike ceramic heater in such a manner as to connect forward ends or forward end portions of a pair of lead elements extending rearward and provided separately from the pair of lead elements provided for application of electricity and extending rearward from the forward heat-generating element.

5. The glow plug with the combustion pressure sensor as claimed in claim 1, wherein the rear heat-generating element is formed of a resistance heat-generating element higher in resistance than that used to form the forward heat-generating element.

6. The glow plug with the combustion pressure sensor as claimed in claim 1, wherein the rear heat-generating element is formed of a resistance heat-generating element lower in resistance than that used to form the forward heat-generating element.

7. The glow plug with the combustion pressure sensor as claimed in claim 1, wherein the annular space communicating with the opening in the forward end of the tubular housing comprises a space which is relatively narrow in a radial direction of the tubular housing and is located toward the forward end and a space which is relatively wide in the radial direction and is located rearward of the narrow space, and, in the wide space, the displacement member is joined to the tubular housing.

8. The glow plug with the combustion pressure sensor as claimed in claim 1, wherein a rear end side of the displacement member is joined to the tubular housing and a front end side of the displacement member is joined to the rodlike ceramic heater.

9. The glow plug with the combustion pressure sensor as claimed in claim 1, wherein a rear end side of the displacement member is joined to the rodlike ceramic heater and a front end side of the displacement member is joined to the tubular housing.

10. The glow plug with the combustion pressure sensor as claimed in claim 1, wherein a rear end side of the displacement member is joined to the rodlike ceramic heater, a front end side of the displacement member is joined to the tubular housing, and a middle portion of the displacement member extends axially forward of the position that the front end side of the displacement member is joined to the tubular housing.

11. The glow plug with the combustion pressure sensor as claimed in claim 1, wherein a rear end side of the displacement member is joined to the tubular housing, a front end side of the displacement member is joined to the rodlike ceramic heater, and a middle portion of the displacement member extends axially rearward of the position that the rear end side of the displacement member is joined to the tubular housing.

12. The glow plug with the combustion pressure sensor as claimed in claim 1, wherein the rear heat-generating element is adapted to generate heat for heating at least a portion of the outer circumferential surface of the rodlike ceramic heater in an axial region between a forward end and a rear end of the displacement member.

13. The glow plug with the combustion pressure sensor as claimed in claim 1, wherein the rear heat-generating element heats at least a portion of the outer circumferential surface of the rodlike ceramic heater in an axial region between a forward end and a rear end of the displacement member to a temperature of between about 400° C. to about 500° C.

14. A glow plug with a combustion pressure sensor including a sensor element, the glow plug comprising a rodlike ceramic heater, the rodlike ceramic heater comprising a ceramic base member formed of electrically insulative ceramic and a forward heat-generating element of a resistance heat-generating element embedded in a forward end thereof and adapted to generate heat through application of electricity, a tubular housing having the rodlike ceramic heater disposed therein with a forward end of the rodlike ceramic heater protruding forward from a forward end of the tubular housing, and the sensor element capable of sensing combustion pressure by detecting pressure or displacement generated as a result of the rodlike ceramic heater being pressed rearward at the forward end of the rodlike ceramic heater by the combustion pressure, an inner circumferential surface of a forward end portion of the tubular housing and an outer circumferential surface of the rodlike ceramic heater defining an annular space communicating with an opening in a forward end of the tubular housing, and the space accommodating a displacement member joined along a circumferential direction to the tubular housing and to the rodlike ceramic heater and being deformable so as to allow displacement of the rodlike ceramic heater along an axis, the glow plug being characterized in that the rodlike ceramic heater has a rear heat-generating element formed of a resistance heat-generating element, adapted to generate heat through application of electricity, and provided in an axial region between a rear end portion of a protruding portion of the rodlike ceramic heater protruding forward from the forward end of the tubular housing and a rear end of the displacement member located rearward of the rear end portion of the protruding portion of the rodlike ceramic heater, wherein the rear heat-generating element is formed of an electrically conductive ceramic provided in the electrically insulative ceramic base member of the rodlike ceramic heater, wherein the rear heat-generating element is provided in such a manner as to be electrically connected in parallel with the forward heat-generating element.

15. The glow plug with the combustion pressure sensor as claimed in claim 14, wherein the axial region is an axial region between the forward end of the tubular housing and the rear end of the displacement member located rearward of the forward end of the tubular housing.

16. The glow plug with the combustion pressure sensor as claimed in claim 14, wherein the rear heat-generating element is provided in an electrically insulative ceramic base member of the rodlike ceramic heater in such a manner as to connect axially intermediate portions of a pair of lead elements provided for application of electricity and extending rearward from the forward heat-generating element.

17. The glow plug with the combustion pressure sensor according to claim 14, wherein the rear heat-generating element is provided in an electrically insulative ceramic base member of the rodlike ceramic heater in such a manner as to connect forward ends or forward end portions of a pair of lead elements extending rearward and provided separately from the pair of lead elements provided for application of electricity and extending rearward from the forward heat-generating element.

18. The glow plug with the combustion pressure sensor as claimed in claim 14, wherein the rear heat-generating element is formed of a resistance heat-generating element higher in resistance than that used to form the forward heat-generating element.

19. The glow plug with the combustion pressure sensor according to claim 14, wherein the rear heat-generating element is formed of a resistance heat-generating element lower in resistance than that used to form the forward heat-generating element.

20. The glow plug with the combustion pressure sensor as claimed in claim 14, wherein the annular space communicating with the opening in the forward end of the tubular housing comprises a space which is relatively narrow in a radial direction of the tubular housing and is located toward the forward end and a space which is relatively wide in the radial direction and is located rearward of the narrow space, and, in the wide space, the displacement member is joined to the tubular housing.

21. The glow plug with the combustion pressure sensor as claimed in claim 14, wherein a rear end side of the displacement member is joined to the tubular housing and a front end side of the displacement member is joined to the rodlike ceramic heater.

22. The glow plug with the combustion pressure sensor as claimed in claim 14, wherein a rear end side of the displacement member is joined to the rodlike ceramic heater and a front end side of the displacement member is joined to the tubular housing.

23. The glow plug with the combustion pressure sensor as claimed in claim 14, wherein a rear end side of the displacement member is joined to the rodlike ceramic heater, a front end side of the displacement member is joined to the tubular housing, and a middle portion of the displacement member extends axially forward of the position that the front end side of the displacement member is joined to the tubular housing.

24. The glow plug with the combustion pressure sensor as claimed in claim 14, wherein a rear end side of the displacement member is joined to the tubular housing, a front end side of the displacement member is joined to the rodlike ceramic heater, and a middle portion of the displacement member extends axially rearward of the position that the rear end side of the displacement member is joined to the tubular housing.

25. The glow plug with the combustion pressure sensor as claimed in claim 14, wherein the rear heat-generating element adapted to generate heat is provided in an axial region between a forward end and a rear end of the displacement member.

26. The glow plug with the combustion pressure sensor as claimed in claim 14, wherein the rear heat-generating element heats at least a portion of the outer circumferential surface of the rodlike ceramic heater in an axial region between a forward end and a rear end of the displacement member to a temperature of between about 400° C. to about 500° C.

* * * * *